(12) United States Patent
Liedmeyer et al.

(10) Patent No.: US 6,511,118 B2
(45) Date of Patent: Jan. 28, 2003

(54) CONVERTIBLE VEHICLE

(75) Inventors: Werner Liedmeyer, Recke (DE); Karl Rothe, Rieste (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/924,997

(22) Filed: Aug. 8, 2001

(65) Prior Publication Data

US 2002/0135201 A1 Sep. 26, 2002

(30) Foreign Application Priority Data

Aug. 14, 2000 (DE) .......................... 100 39 683

(51) Int. Cl.[7] .................................. B60J 7/20
(52) U.S. Cl. ............ 296/107.17; 296/108; 296/107.08
(58) Field of Search ................. 296/108, 121, 296/107.08, 136, 116, 107.17

(56) References Cited

U.S. PATENT DOCUMENTS

| 4,618,180 | A | * | 10/1986 | Muscat ................... 296/120.1 |
| 5,551,743 | A | * | 9/1996 | Klein et al. ................ 296/76 |
| 6,053,560 | A | * | 4/2000 | Rothe ....................... 296/108 |
| 6,168,224 | B1 | * | 1/2001 | Henn et al. ............... 296/136 |
| 6,315,349 | B1 | * | 11/2001 | Kinnanen .................. 296/108 |
| 6,390,531 | B1 | * | 5/2002 | Schutt .................... 296/107.13 |
| 6,419,296 | B2 | * | 7/2002 | Ditner et al. ......... 296/107.18 |

* cited by examiner

*Primary Examiner*—D. Glenn Dayoan
*Assistant Examiner*—Greg Blankenship
(74) *Attorney, Agent, or Firm*—Jordan and Hamburg LLP

(57) ABSTRACT

A convertible vehicle (1) with a roof (2), which can be stowed in the rear region of the vehicle beneath a lid part (7), the lid part (7) being movable in order to open up an opening for the passage of the roof and the roof having at least one rigid, front roof termination (16) for connection with a windshield frame in the closed position of the roof (2), which termination (16) faces the rear of the vehicle in the stowed position of the roof (2), is constructed so that the lid part (7) is provided with a mechanism (25, 27) for securing the position of the front roof termination (16) in the stowed position of the roof (2).

5 Claims, 5 Drawing Sheets

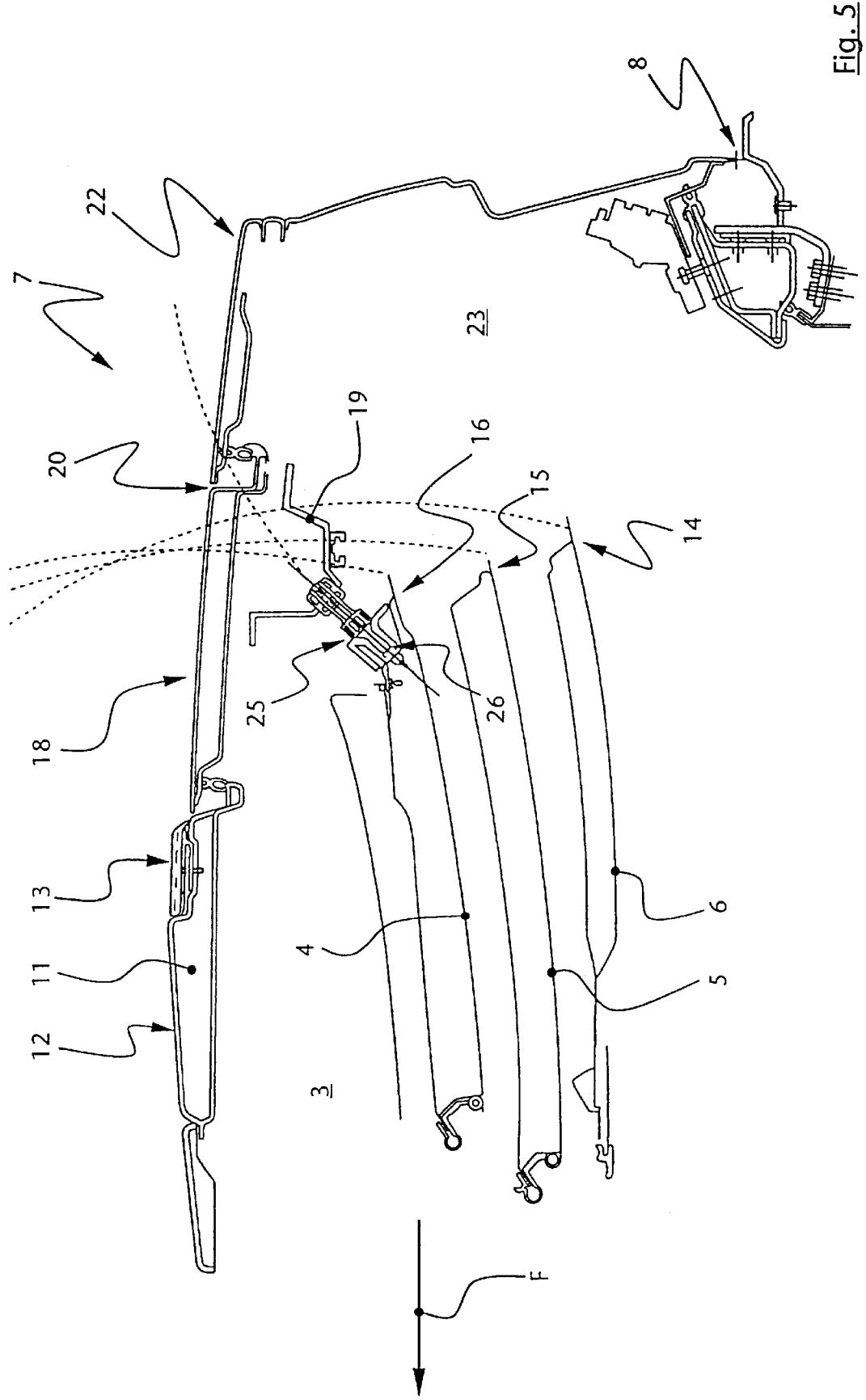

CONVERTIBLE VEHICLE

BACKGROUND OF THE INVENTION

The invention relates to a convertible vehicle.

In the case of such convertible vehicles, it is desirable to fasten the roof even in the stowed position, in order to avoid rattling noises and to prevent roof parts striking one another, especially when these are painted.

For this purpose, the DE 195 33 802 C2 provides that, in the stowed position, a front roof section is held in the same orientation as in the closed position and with its front locking elements, which face the windshield frame in the closed position, engages a corresponding thrust bearing of the car body, which is disposed in the region of a splashboard between the space for accommodating the folding top and the trunk. For this the outer surface of the roof must point upward even in the stowed position of the roof, which frequently requires an undesirable Z folding of the roof. In addition, the insertion must be accomplished with a high degree of accuracy, in order to enable the locking elements subsequently to extend into the thrust bearings, which are fixed to the car body.

SUMMARY OF THE INVENTION

It is an object of the invention to bring about a convertible vehicle, in which the stowed roof is fixed in a simple manner.

Pursuant to the invention, this objective is accomplished by a convertible vehicle with the distinguishing features of claim 1. Further advantages developments of the object of the invention are given in the claims 2 to 5.

With the inventive arrangement of means for securing the position at the lid part covering the folding-top compartment, the movement of the lid part, such as the closing of this part over the stowed roof, can also result in the locking of the inserted roof.

Particularly advantageously, means for securing the position, at least centering means, are automatically brought into the engaged position with the termination of the front part of the roof during the closing of the lid part by moving the latter, so that, while the lid part is lowered, the exact alignment of the roof is achieved without the need for a further movement of the inserted roof or of the locking elements. For precisely adjusting roof-securing elements and position securing elements relative to one another, centering means can be used, which can be adjusted in an uncomplicated manner over the simple swiveling movement of the lid part. It is possible to dispense with adjusting the roof by the driving mechanism for stowing the roof, which is far more complicated.

If the means for securing the position correspond to those of the windshield frame, a centering and a closing can take place, as it does when the roof is fixed to the windshield. As a result of the centering, the roof part, which is to be fixed, is aligned transversely to the vehicle and relative to its vertical axis, in order to make an engagement of the locking elements possible. This engagement can be secured over locks, which are required anyhow by the rigid termination of the roof for fixing it at the windshield frame.

Further advantages and details of the invention arise out an example of the invention, which is described in the following and shown in the accompanying drawings.

BRIEF DESCRIPTION OF THE DRAWINGS

FIG. 5 shows a view, similar to that of FIG. 4, with a section offset in the transverse direction of the vehicle.

DESCRIPTION OF THE PREFERRED EMBODIMENTS

Figure 1:
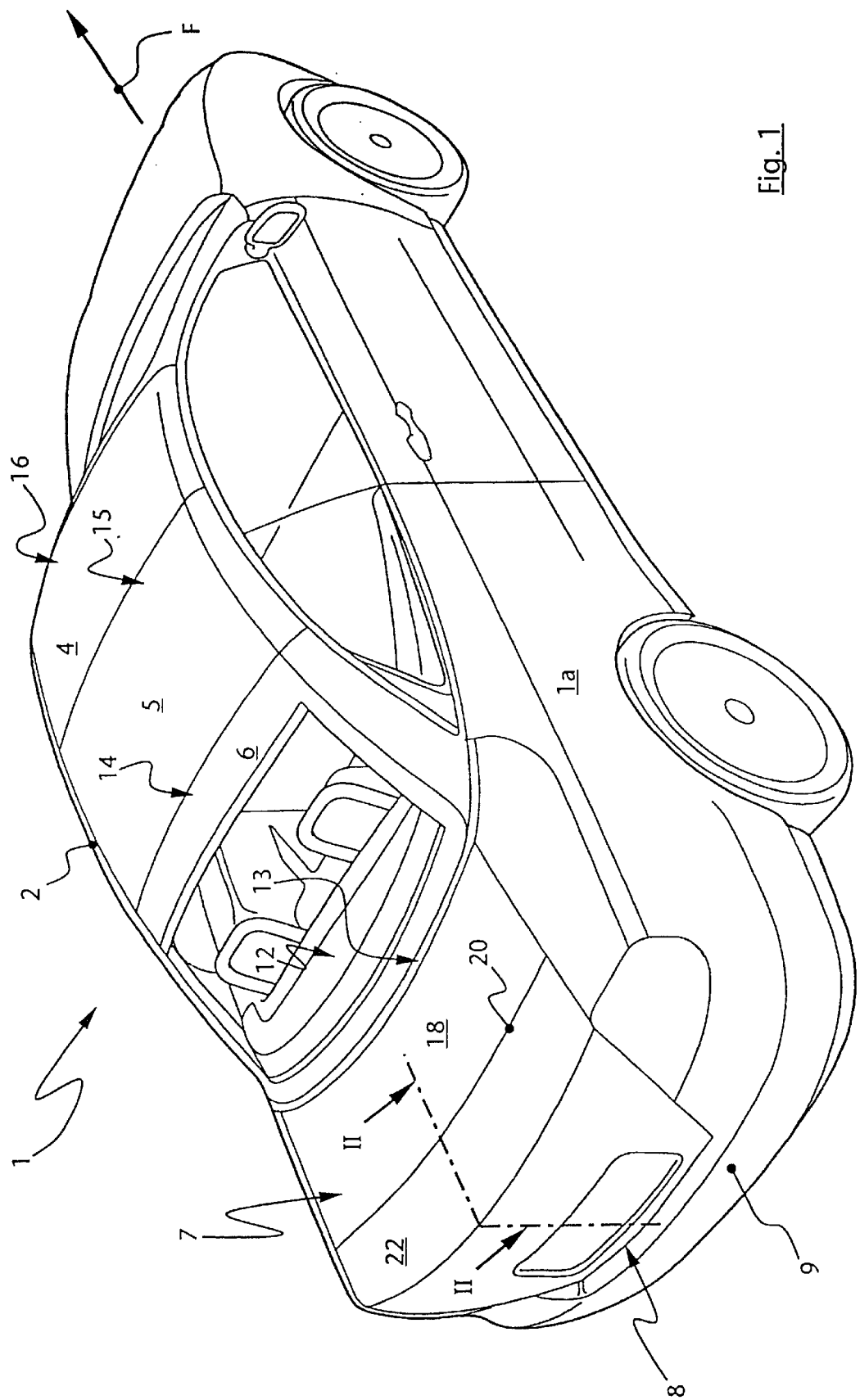
FIG. 1 shows an inventive convertible vehicle with the roof closed, in a perspective rear view.
Figure 2:
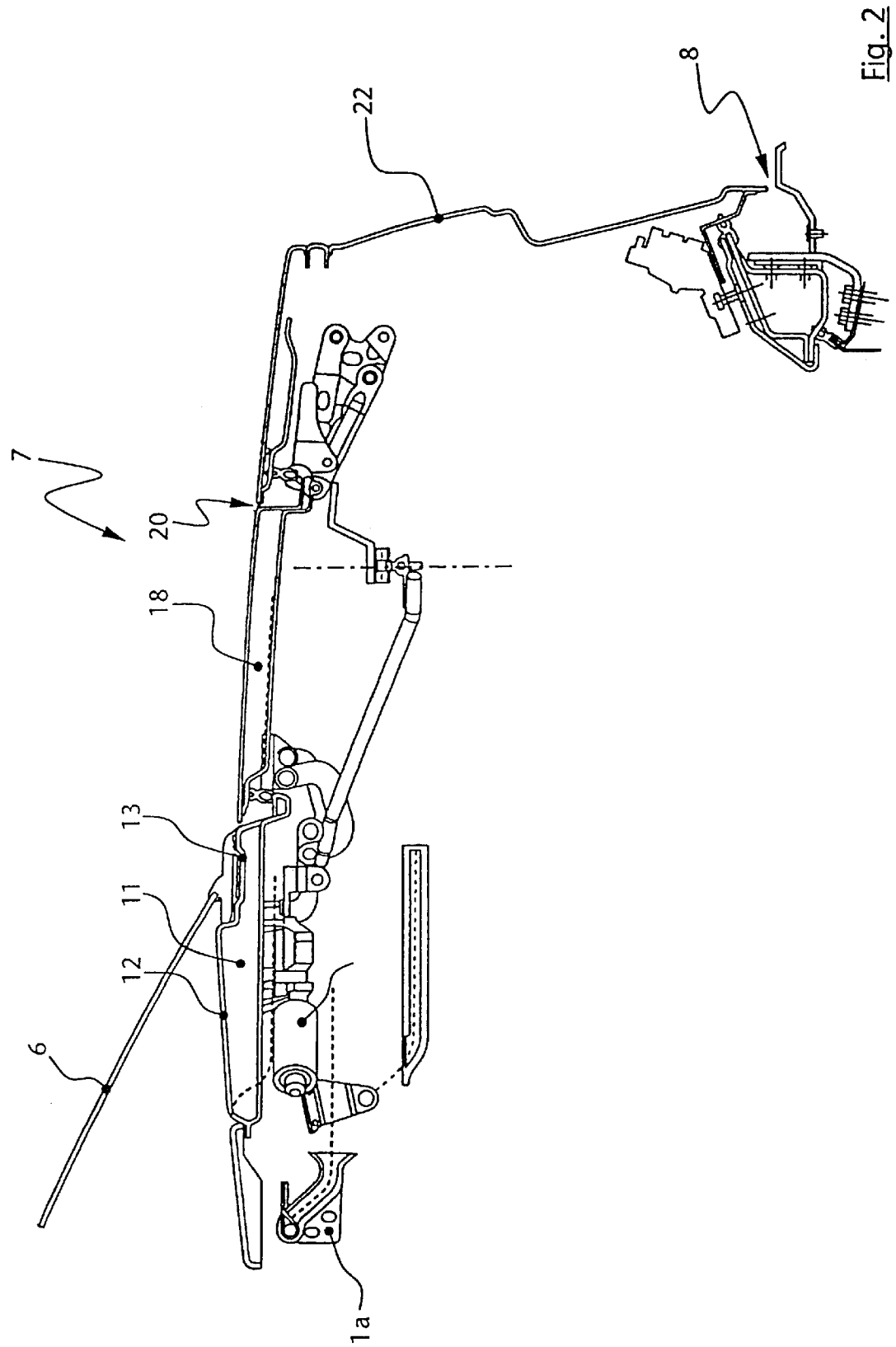
FIG. 2 shows a section along the line II—II of FIG. 1.

The convertible vehicle 1, shown in the example, has a movable roof 2, which can be moved between a closed position (FIG. 1) and an open position (FIGS. 4 and 5), in which it is stowed in a folding-top compartment 3. The roof 2 may comprise several rigid, platelike parts 4, 5, 6 or also be constructed completely flexibly at least regionally or outside of a supporting frame. For covering the opened roof 2, which is stowed in the folding top compartment 3, a lid part 7 is provided, which is fixed movably in a rear hinge region 8 to the car body 1a and, for the purpose of opening it (FIG. 3), can be swiveled up to open up the opening for the passage of the roof in such a manner, that the latter encloses an acute angle with the driving direction F.

Figure 3:
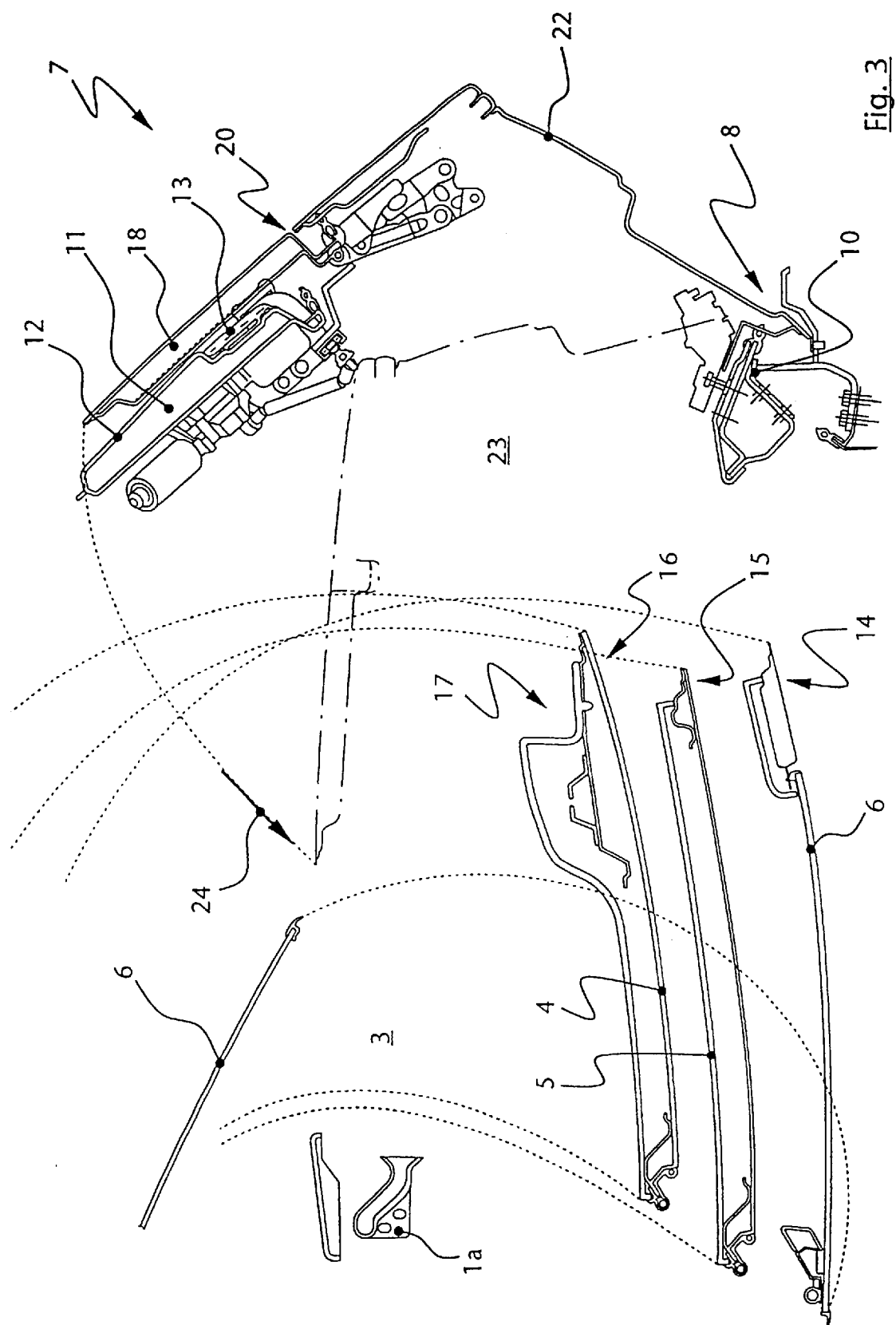
FIG. 3 shows a view similar to that of FIG. 2, during the swiveling up of the lid part
Figure 4:
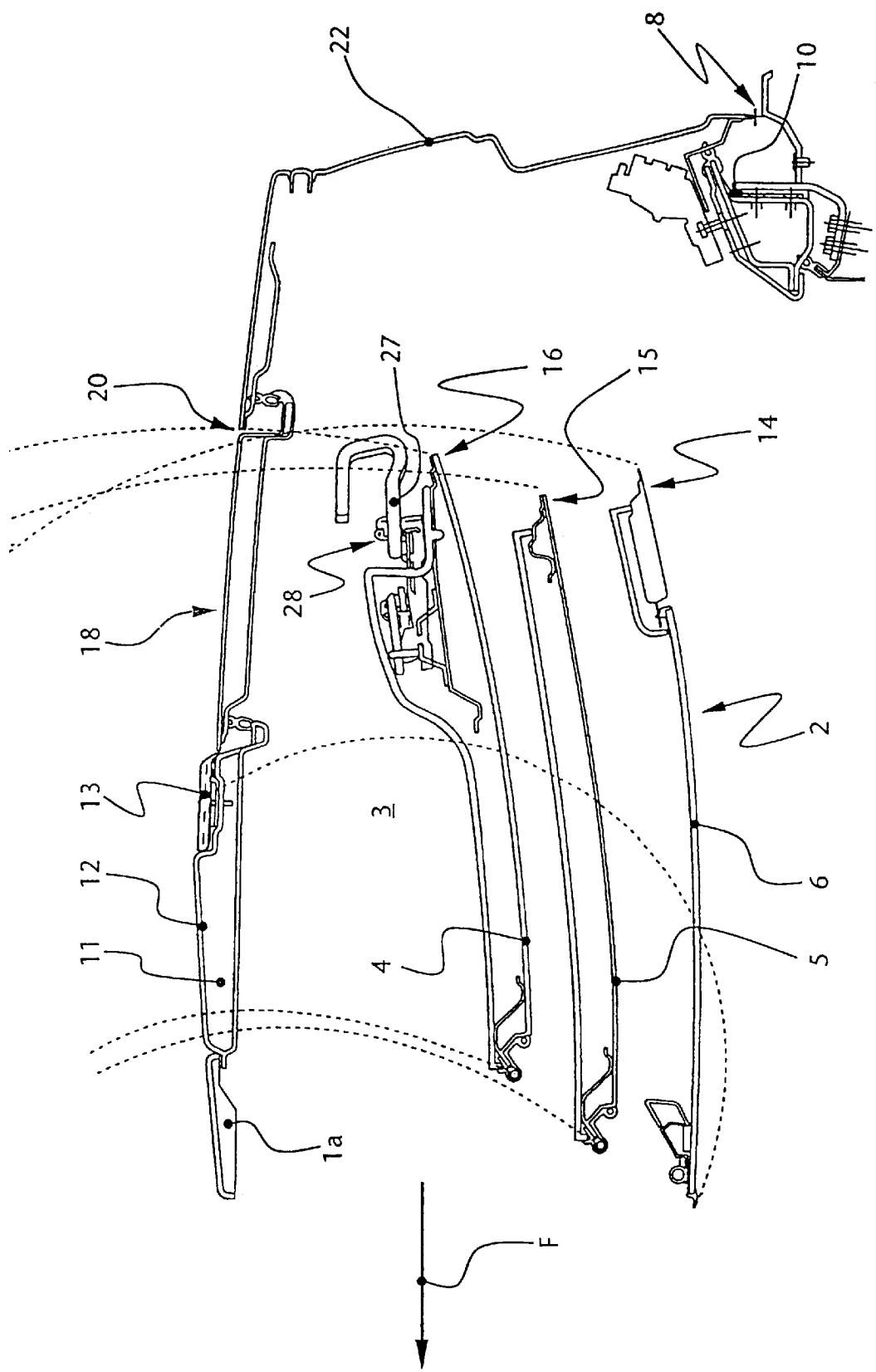
FIG. 4 shows a view, similar to that of FIG. 3 with the lid part swiveled shut and the roof stowed.

Instead of the lid part 7, which is shown here and extends up to the bumper 9, it is also possible to provide a smaller lid part, which covers only the top of a rear folding top compartment, the dimensions of which are fixed. The roof part 7 is shown in FIG. 3 in the swiveled-up position, in which it is swiveled up about a swiveling axis 10, which follows essentially the transverse course of the vehicle and is located in the rear end region 8.

In the example, the lid part 7, in the region, which is the front region in the closed position, has an area expansion 11, which can be shifted parallel and forms, in its front region 12, a rear-window shelf and, in its rear region 13, a supporting surface for the rear part 6 of the roof 2. This expansion is retracted, in order to enable the lid part 7 to swivel up. In the closed position of the lid part 7, it is extended towards the front when the roof 2 is opened as well as when it is closed and, when the roof 2 is closed, forms a lower supporting surface for the rear part 6 of the roof 2.

In the stowed position (FIG. 3), the roof 2 is inserted in the folding-top compartment 3 in such a manner, that the rear part of the roof, with what is its front end 14 in the closed position, the middle part of the roof with what is its front end 15 in the closed position and the front part of the roof with what is its front end 16 in the closed position face the rear of the vehicle. All three parts of the roof 4, 5, 6 are in the turned position one above the other.

A different number of roof parts, as well as a different folding, are possible, for example, one in which a middle part of the roof is stowed in the reverse orientation with respect to the front and rear parts of the roof.

In each case, the edge region 16, which is the front region in the driving direction, of the front part 4 of the roof, points towards the rear in the stowed position. On the other hand, the region 17, which is held at the windshield frame in the closed position, points upward.

Below its region 18, which is essentially horizontal in the closed position, the lid part 7 has an integrally molded bracket 19. This is disposed and curved in such a manner, that its configuration corresponds to that of a windshield frame and its position is turned by 180° with respect to this frame, so that the position of the roof part 4, which is the front part in the stowed position, is the same relative to the bracket 19 as is the position of the front part 4 of the roof in the closed position of the roof 2 relative to the windshield frame. The bracket 19 can be swiveled together with the lid part 7 and is disposed fixed with respect to the latter.

In the example, the lid part 7 furthermore has a transverse joint 20, which separates the front area region 18, which carries the bracket 19 and is horizontal in the closed position of the roof part 7, from a rear flap part 22, which can be hinged thereto. This flap part 22 can be opened separately, while the front area part 18 remains horizontal, in order to open up an opening for loading the trunk 23. The position of the bracket 19 remains unaffected hereby.

During the closing of the lid part 7 over the stowed roof (direction of arrow 24), the bracket 19, which is moved with the lid part 7, is swiveled downward in such a manner, that centering pins 25 in the front termination 16 disposed at the bracket 19, engages accommodating openings 26 assigned to the front part 4 of the roof. These accommodating openings 26 have a conically tapering neck region, over which a centering of the inserted roof 2 is possible. In particular, the roof 2 is disposed in the transverse and upright direction of the vehicle and, at the same time, the locking means 27, which are constructed here as hook parts, engage corresponding locks 28 of the front edge region 14 of the front part 4 of the roof. The centering and locking means 25, 27 at the bracket 19, correspond exactly to those of the windshield frame.

The position, in which the centering and locking means 25, 27 engage the corresponding counter pieces 26, 28 of the roof part 4, is achieved without an independent driving mechanism, merely by closing the roof part 7.

The locks 28 of the front terminations 16 of the roof can be moved by a driving mechanism, which is assigned to this termination of the roof, in order to achieve a locking of the front part 4 of the roof at the windshield frame. This driving mechanism can also be used in order to secure the locks 28 at the locking means 27 of the lid part 7. A separate driving mechanism is not required. Likewise, because of the centering about the centering means 25 in the counter pieces 26, the locking motion of the locks 28 can be carried out in exactly the same manner as at the windshield frame.

Since the roof parts 4, 5, 6 are connected with one another, the whole roof 2 is aligned securely in its stowed position and secured against movement by fixing the front part 4 of the roof. With that, the roof 2 can be stowed as a very flat package with small distances between the roof parts 4, 5, 6, without running the risk that these will collide. The stowage space of the trunk 23 can thus be maximized. The torsional rigidity of the vehicle is increased and rattling noises and damage to the roof 2 are avoided.

What is claimed is:

1. A convertible vehicle (1) with a roof (2), which can be stowed in a rear region of the vehicle beneath a lid part (7), the lid part (7) being movable in order to open up an opening for passage of the roof and the roof having at least one rigid, front roof termination (16) for connection with a windshield frame in a closed position of the roof (2), which termination (16) faces the rear region of the vehicle in a stowed position of the roof (2), wherein the lid part (7) is provided with means (25; 27) for securing the position of the front roof termination (16) in the stowed position of the roof (2).

2. The convertible vehicle of claim 1, wherein the means (25; 27) for securing the position can be brought automatically, by closing the lid part (7), into a position, in which they engage the roof termination (16) of the roof (2).

3. The convertible vehicle of one of the claims 1 or 2, wherein the means (25; 27) for securing the position comprise at least one centering device (25) for centering the (2) in the transverse direction of the vehicle.

4. The convertible vehicle of one of the claims 1 or 2, wherein the means (25; 27) for securing the position contain at least one centering at least one centering device (25) for adjusting the stowed roof along a vertical axis.

5. The convertible vehicle of one of the claims 1 or 2, wherein the means (25; 27) for securing the position are disposed on a bracket part (19) in the lid (7).

* * * * *